Jan. 23, 1923.
E. R. STODDARD.
METHOD FOR FORMING VEHICLE BODIES FROM SHEET METAL.
FILED JUNE 29, 1920.
1,442,912.
5 SHEETS—SHEET 1.
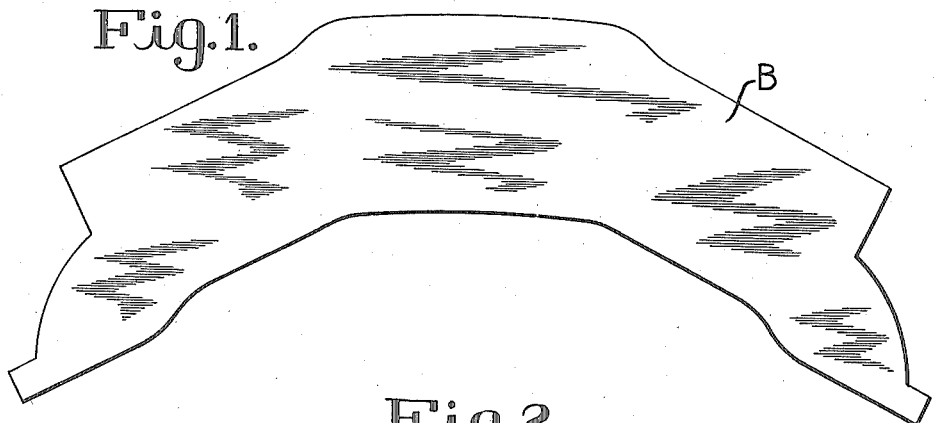
Fig.1.
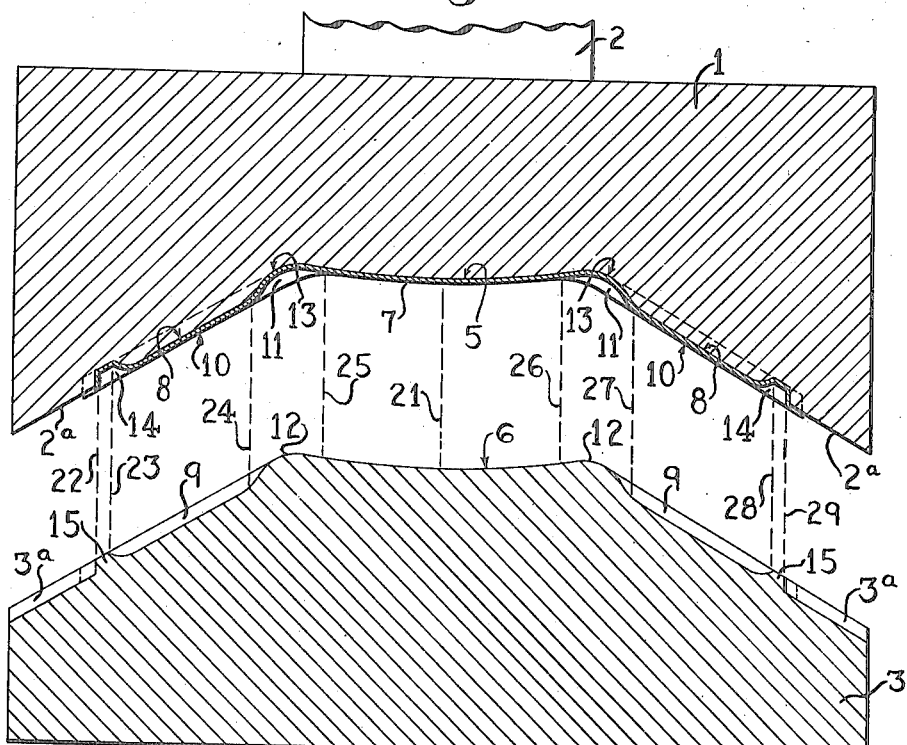
Fig.2.
Fig.3.
INVENTOR
Edgar R. Stoddard
BY
Stewart & Perry
his ATTORNEYS Jan. 23, 1923. 1,442,912.
E. R. STODDARD.
METHOD FOR FORMING VEHICLE BODIES FROM SHEET METAL.
FILED JUNE 29, 1920. 5 SHEETS—SHEET 5.
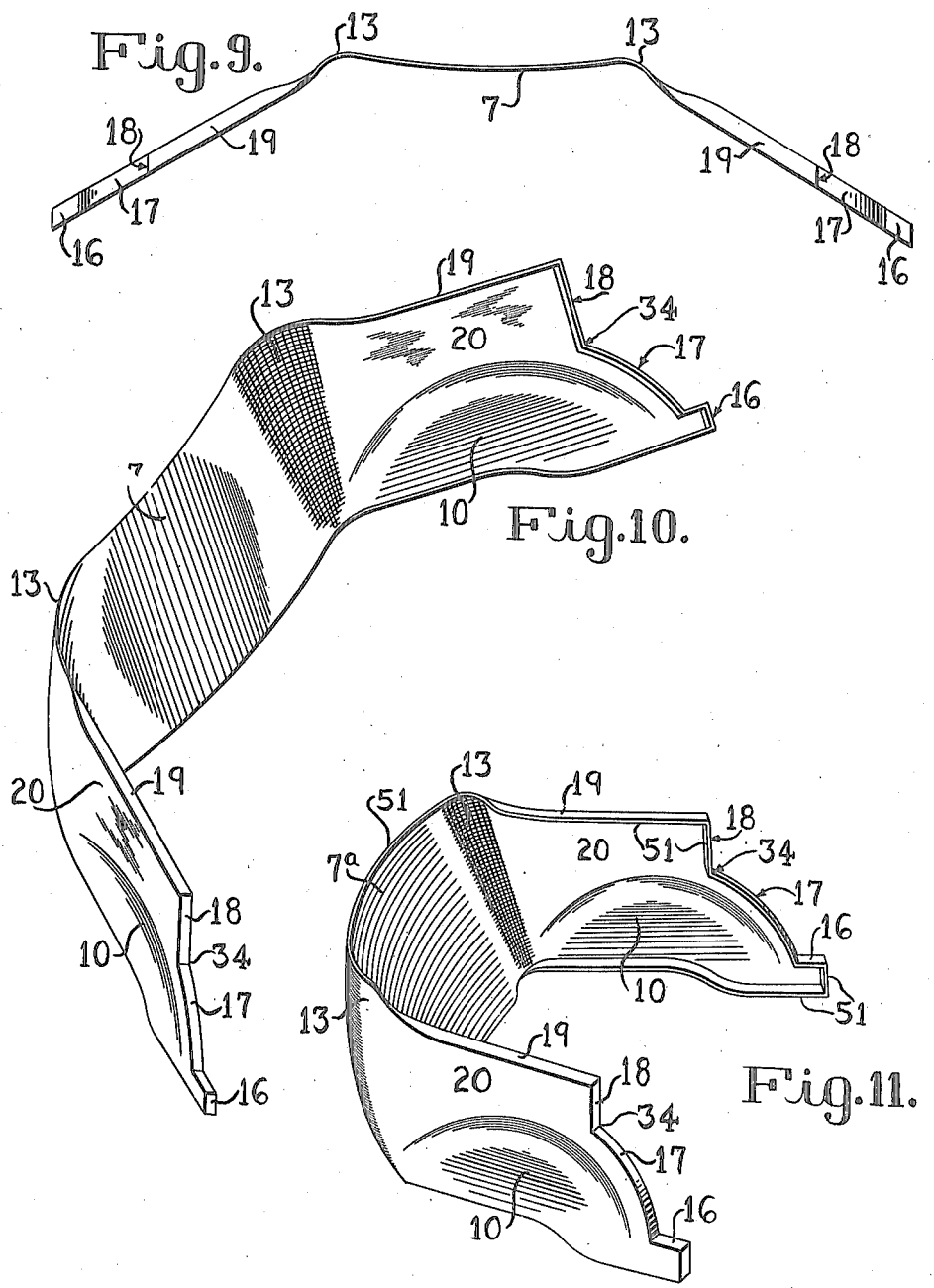

Patented Jan. 23, 1923.

1,442,912

UNITED STATES PATENT OFFICE.

EDGAR R. STODDARD, OF SOUTH BEND, INDIANA, ASSIGNOR TO THE STUDEBAKER CORPORATION, A CORPORATION OF NEW JERSEY.

METHOD FOR FORMING VEHICLE BODIES FROM SHEET METAL.

Application filed June 29, 1920. Serial No. 392,813.

*To all whom it may concern:*

Be it known that I, EDGAR R. STODDARD, a citizen of the United States of America, and resident of South Bend, in the county of St. Joseph and State of Indiana, have invented certain new and useful Improvements in Method for Forming Vehicle Bodies from Sheet Metal, of which the following is a specification.

This invention has reference to the art of shaping, pressing or stamping articles of manufacture from sheet metal, or other suitable materials, and, particularly, has reference to the bodies of road vehicles, such, for example, as tonneaus and other automobile bodies, and to the method of producing the same.

Among the objects of my invention may be noted the following: to produce automobile bodies from a single sheet of material by an economical, rapid and effective method or process; to produce automobile bodies with facility by an economical process enabling the said bodies to be manufactured from a single sheet of material suitable for the purpose; to produce the bodies of automobiles and similar vehicles from a single sheet of strong, stiff material by a simple and rapid process involving a comparatively few steps or operations; to provide a method through the medium of which strong and durable bodies of automobiles and other road vehicles can be produced economically, with great rapidity and with facility from a single sheet or strip of material; and to provide a strong, durable, and distinctive vehicle body, such as the tonneau of an automobile, made from a single piece of sheet material.

It should be understood that heretofore the bodies of automobiles and similar vehicles have been made of several pieces of sheet material welded or otherwise fastened together, the process for producing the same being tedious, laborious and expensive. In some instances, automobile and similar bodies have been formed from two similar members joined together at the back of the body by a welded seam. These modes of producing automobile bodies are unsatisfactory and expensive, and the products are neither strong, durable nor satisfactory, and are found to shake or work apart and show defects after short use, due to the constant vibration and jolting of the car in use. I obviate all the difficulties and objections heretofore experienced in making automobile bodies, or other vehicle bodies, of sheet material by forming said bodies from a single sheet or strip of material and employing the several steps constituting my process, as hereinafter described.

In order that my invention may be clearly understood, I have provided drawings showing the product and the several steps employed in producing the same, and therein:

Figure 1 is a plan view of a tonneau body-blank which has been cut or stamped from a strip or sheet of metal;

Figure 2 is a section of the female die of the first set of dies employed by me and also showing the blank of Figure 1 after it has been pressed or formed, Figure 3 is a view similar to Figure 2 of the male die;

Figure 9 is a top plan or edge view of the product of the two dies shown in Figures 2 and 3;

Figure 10 is a perspective view of the product, Figure 9; and

Figure 11 is a perspective view of the product of the dies of Figures 4 to 6.

Figure 4:
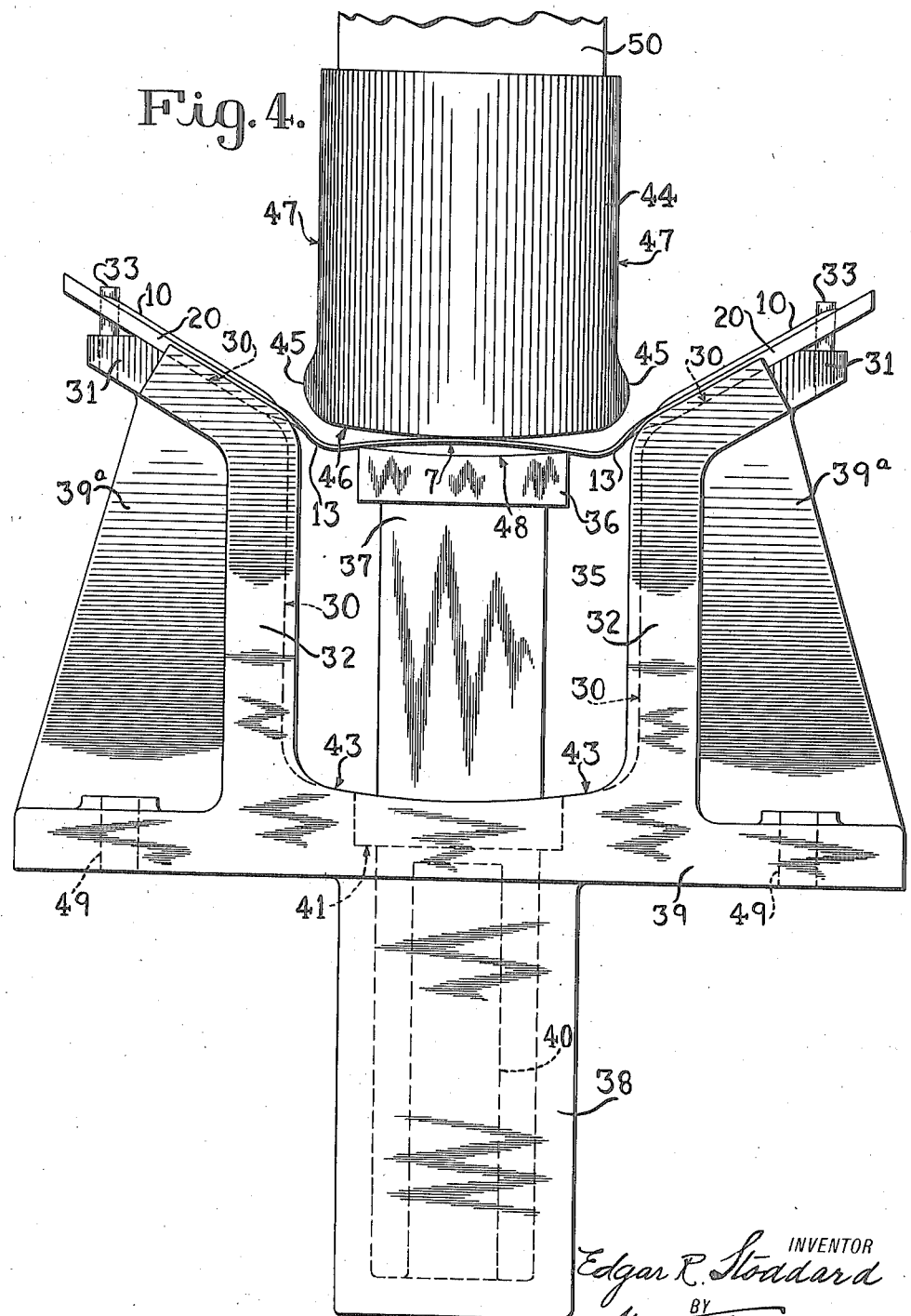
Figure 4 is a side elevation of the second set of dies employed, showing the product of the dies of Figures 2 and 3 in position to be operated upon.

The first step performed, in carrying out my process, is the production of a blank of proper shape and size to be subsequently pressed into form by the dies. This blank is cut, stamped, or otherwise produced, and is given the shape shown in Figure 1, which is approximately that of the finished article, in so far as shape of outline is concerned. The blank is produced from a single sheet of suitable material by means of suitable cutters, and it is sufficient to refer to this step of my process as the production of a suitable blank from sheet material, since it is not important to the process of my present invention whether the same is produced by hand, dies, machinery, or otherwise. For convenience the blank will be indicated by B.

In Figures 2 and 3 of the drawings, the numeral 1 indicates the block or body of the female member of the first set of dies which I employ in producing the vehicle body according to my invention, and said member is supported in any suitable manner, conventionally shown at 2. The face of the female die has the necessary conformations, or characteristic features, to produce the body-shape or second product shown in Figures 9 and 10, the said product being also shown in Figure 2, after the male member 3, Figure 3, of the dies has pressed the sheet of material or metal B into the female die 2. The male die is supported in suitable manner, conventionally shown at 4.

Figures 2, 9 and 10 show the result of the second step of my process which is to subject a sheet of flat material, such as metal, to the pressure of a pair of primary dies having facial features or conformations of a predetermined character. Generally speaking, the female member of the dies has a central, convexed portion indicated by 5, which, in cooperation with the concaved portion 6 of the male die, produces the inwardly bulged portion 7 of the secondary product, or body-shape, Figures 2, 9 and 10. This inwardly bulged portion is produced for the purpose of providing a surplus of material at the back of the body-shape whereby, when the final form is given to the back of the body-shape, enough of material will be present to give the necessary convexity in two right-angular directions, as will be presently described.

The female die 1 is also provided with oppositely flared faces at an obtuse angle to the surface 5, and said faces, near their outer ends, are provided with longitudinally curved, outwardly projecting faces 8 adapted to enter corespondingly formed depressions 9 in the correspondingly inclined faces of the male die. These facial characteristics of the two die members produce the inwardly bulged, semi-circularly curved members 10 which extend longitudinally of the sides of the body-shape adapted to receive the inside faces of the circumference of the rear wheels of the automobile.

At the opposite sides of the convex portion 5 of the female die are formed the semi-circular grooves 11, which extend substantially from top to bottom of the said female die. These grooves are adapted to cooperate with the correspondingly formed projections or protuberances 12 on the face of the male die at the opposite sides of the con-cavity 6, the two features 11 and 12 being adapted to produce the outwardly bulged, substantially semi-circular corners 13 extending practically from top to bottom of the body-shape at the bends of the latter where the back 7 terminates on opposite sides, and the sides of the body-shape begin. The die members are so formed, and the features just described are so related, that the second product, resulting from the cooperation of the two dies of Figures 2 and 3, takes the general form shown in Figures 9 and 10, wherein the two sides of the body-shape stand at obtuse angles to the concaved back 7 of the body-shape, this form being held by the transverse grooves 13, produced in the sheet of material of which the body-shape is formed, at the two terminals of the back 7. The female die 1 also has in its face angular grooves, indicated generally by 14, located near its opposite ends and extending inwardly, and then upwardly and inwardly in a curved direction, and then upwardly at an obtuse angle, and then inwardly in substantially a straight line to the bulge 11. This assumes the dies 1 and 3 are disposed to operate horizontally; but, it will be understood that said dies can be disposed so as to operate in a vertical plane. The male die 3 has corresponding angular projections 15 adapted to cooperate with the grooves 14. Hence, the secondary product, Figure 10, will be produced, regardless of the plane in which the dies are arranged to work, having the oppositely disposed, outwardly flared, angular, substantially horizontal side body members, comprising the straight members 16 extended into the curved portions 17, continuing partially around the wheel projections 10, and, in turn, extending into the substantially vertical portions 18, joined by the horizontal portions 19, which extend longitudinally of the body-shape to the bulges 13 at the junction of the back with the side body members of the body-shape. The cooperative features of the dies which produce these several angular characteristics of the body-shape, together with the surfaces adjacent said features, also produce the general side body bulges 20 above and around the wheel cavities or grooves 10, and extending from the bulge 13 and in continuity with the latter to the outer ends of the cavities 10. The entire outline of the grooves 14 and projecting members 15 of the respective dies is not shown in Figures 2 and 3; but, it will be readily understood that the respective faces of the male and female dies correspond to the outside and inside, respectively, of the body-shape shown in Figure 10. Hence, it is unnecessary to show in every detail the outline of the angular features, or characteristics, 14 and 15 of the respective die members. Beyond the grooves 14, the die 2 has the flat surface 2ª and the die 3 has the grooves corresponding thereto, as at 3ª. The die members thereby properly retain their cooperative relation.

An important characteristic or feature of my invention, in so far as the dies or die members are concerned, is that they shall be so constructed that the male member may freely enter and withdraw from the female member by movement of one or the other in a perfect right-line, and also that the die faces shall be so formed that the facial angles of the respective die members shall cooperate in a manner such that the walls, which are at an angle to the faces of the respective dies, or parts thereof, shall interact without tearing, cutting, abrading or unduly stretching, straining or distorting the material. This is brought about by having all the angles and curves of the facial features of the two dies lie in substantially the same plane, which is parallel with the central transverse axis of the dies and cuts the vertices of any of the angles of the respective dies, or cuts the points of juncture of the straight walls or faces of the dies with the curved or angular faces thereof. This will be better understood by reference to Figures 2 and 3, wherein the line 21 indicates the longitudinal axis of the dies, and the lines 22, 23, 24, 25, 26, 27, 28 and 29 indicate substantially the planes which are parallel with said axis and cut the vertices of the several angles, or points of juncture of curved and straight surfaces.

Figure 5:
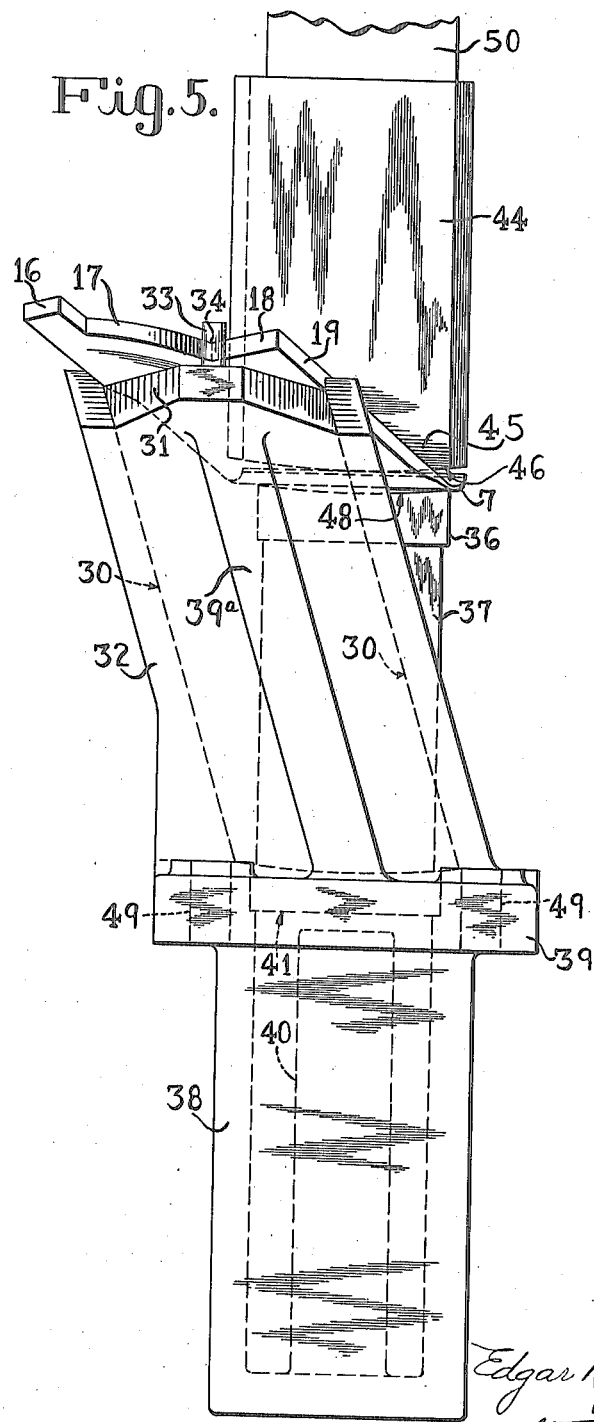
Figure 5 is an end elevation of Figure 4 showing the angle at which the male and female dies cooperate in pressing the partially formed body.
Figure 6:
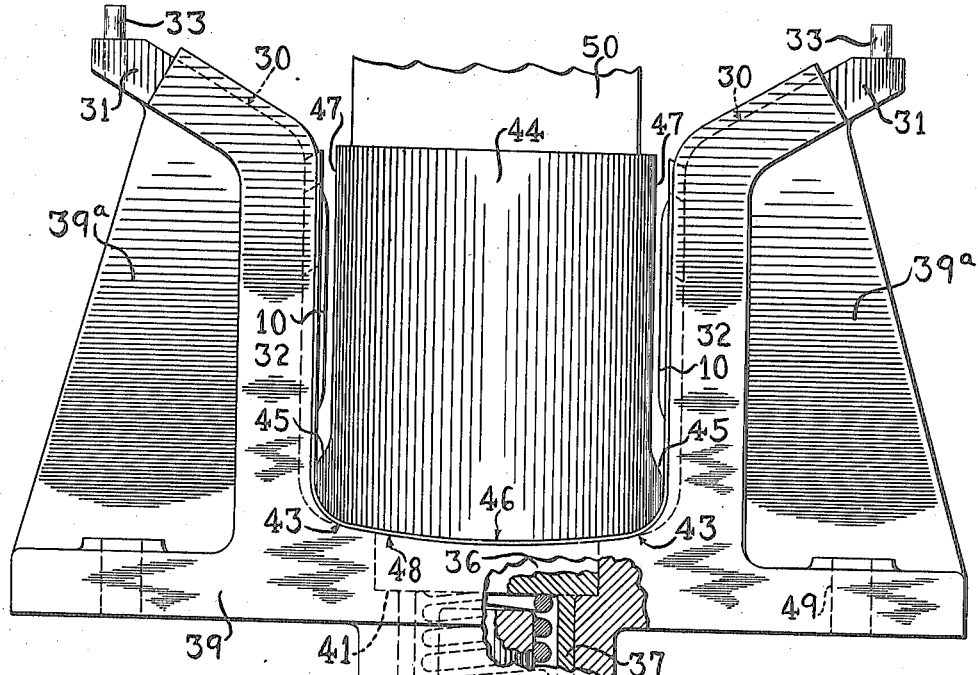
Figure 6 is a view similar to Figure 4 with the parts in different position, sections being broken out to show details of construction.
Figure 7:
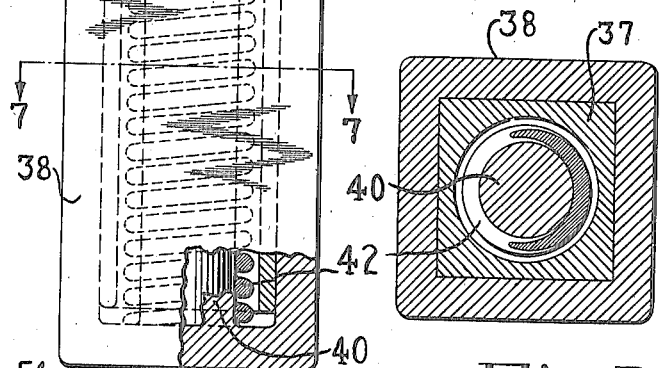
Figure 7 is a section on the line 7—7 of Figure 6.
Figure 8:
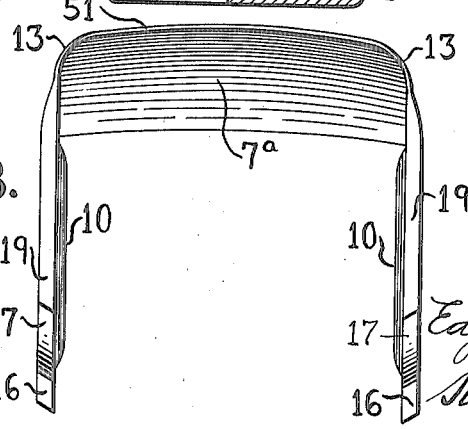
Figure 8 is a top plan view of the product of the dies of Figures 4 to 6.

The body-shape of Figure 10, produced by subjecting the blank B, of Figure 1, to the dies of Figures 2 and 3, has the three final characteristics imparted thereto by placing it between the two secondary or finishing dies shown in Figures 4 to 7. The body-shape is set upon or within the female die with the bulged portions 20 and angular members 16, 17, 18 and 19 lying within wide channels or longitudinal grooves 30 of wing members 31 arranged at an obtuse angle to the vertical walls 32 of the die and extending outwardly from the latter. The outer end of each of the wing members 31, is provided with an angular, registering block or lug 33 adapted to enter the angle 34, and shaped to correspond therewith, of the body-shape, see Figures 4, 5, 6, so as to enable the operative to quickly and accurately place the body-shape upon the die. This is important since it enables an unskilled operative to quickly and accurately center the body-shape upon the female die and prevents any possibility of said shape being distorted or misshaped during the pressing operation. Figure 5 also shows the vertical walls 32 of the female die to be laterally inclined relatively to the vertical plane of operation of the male die 44. The importance of this will be presently seen. The female die is provided with a deep recess 35, the inner or bottom wall of which is recessed centrally for the reception of a plunger-head 36, carried by the hollow plunger 37, Figures 6 and 7, working in the tubular extension 38 of the female die and formed integral, if desired, with the base 39 of the die-block. The extension 38 has a central cylindrical post 40, extending to just below the seat or shoulder 41 upon which the plunger-head bottoms. The post 40 sustains a surrounding coiled spring 42, one end of which rests on the bottom of the extension 38 and the top of which engages the plunger-head, the expanded spring holding said plunger-head normally raised to highest position, as shown in Figure 4, the lowest position of the plunger being shown in Figure 6, with the spring compressed. The top surface of the plunger-head 36 is formed to convert, in cooperation with the male die member 44, the back 7 of the body-shape into the concavo-convex form 7ª shown in Figures 8 and 11, inclined outwardly from bottom to top. The surfaces of the bottom of the recess 35 of the female die, adjacent the plunger-head seat 41, on both sides, Figures 4 and 6, are formed to continue the surface of the plunger-head 36, as indicated at 43; that is to say, both laterally and longitudinally, the surfaces 43 are formed in continuity of the plunger-head 36 so as to give the continuous back curvature longitudinally and transversely of the body-shape, as shown in Figures 8 and 11, at 7ª. This curvature is continued to the grooves 13 in the body-shape which mark the juncture between the back and side-body portions of the body-shape. The grooves 30 are continued into the vertical walls of the female die so as to prevent any distortion of the features, given to the body-shape in the dies of Figures 2 and 3, when said shape is forced into the female die as in Figure 6, the said grooves terminating at the surfaces 43 of the bottom of the die. This provides for the reception of the bulges at the grooves 13 without distorting or indenting them. The end face, or functional end, of the male die 44, is shaped to correspond with the contour of the bottom wall of the female die and the surface of the plunger-head 36 thereof; that is to say, it is convexed as at 46 at its executive end in two directions at a right-angle to each other so as to fit the curvature of the bottom wall of the female die and plunger-head between the side grooved walls 32. It is also provided with the lateral bulges or extensions 45, adapted to enter the grooves 13 of the body-shape and prevent the latter from shifting in the female die when the male die is forced inwardly as in Figure 6. The bulges 45 also cooperate with the surfaces 43 at the bottom of the female die and aid in finally setting the curvature and bulges at the grooves 13 of the body-shape.

Thus, as the male member 44 is pressed inwardly against the bulged back portion 7 of the body-shape, the face 46 of said male member first pushes the bulged portion 7 of the body-shape outwardly against the surface of plunger-head 36, and then presses the entire body-shape into the female die causing the side members of the body-shape to approach each other, and extend substantially parallel with the longitudinal walls 47 of the male die and maintain that relation until the male die has completely pressed the body-shape into the female die, as shown in Figure 6, and given said body-shape, at the back 7, the double concavo-convexed form, in two directions at a right-angle to each other, shown in Figures 8 and 11. That is to say, the back 7 of the body-shape is given its compound convexity both vertically and horizontally without disturbing, distorting or in any manner changing the characteristic features otherwise given to the body-shape, as shown in Figures 9 and 10, by the die members 1 and 3, excepting that the side members of the body-shape are brought into parallelism and substantially at a right-angle to the back of the body-shape. It will be noted that the male die 44 is much narrower than the opening 35 in the female die, thus avoiding any possibliity of crushing or distorting the side members of the body-shape when the latter is subjected to the action or pressure of the secondary dies, Figure 6. It will also be noted, as an important feature of my invention, that the male die 44 operates at an angle to the side walls 32 of the female die, Figure 5, and in this figure it will be seen that the cooperating surfaces 46 and 48, of the male die and plunger-head of the female die, are so inclined transversely of the body-shape and so formed longitudinally of said shape as to give to the back 7 of the latter, at a single operation, the longitudinal concavo-convex form and the transverse concavo-convex form with inclination from bottom to top of the body-shape, as seen in Figures 8 and 11. This arrangement of the die members and the shape of their cooperating surfaces is important in that the double concavo-convexity and the inclination of the back 7 of the body-shape can be imparted to the latter at a single operation and without in any manner affecting or disturbing or straining or distorting the side-body members or their characteristic features. Thus, the male die does not disturb any of the facial features of the body-shape; but, simply presses the back 7 outwardly and gives it its compound curvature, in cooperation with the plunger-head and adjacent surfaces of the female die, and causes the two side members of the body-shape to approach each other and become parallel. Thus, the secondary product, Figures 9 and 10, produced by a single operation of dies 1 and 3, is converted into the final product, Figures 8 and 11, by a single operation of the secondary dies.

Viewing Figures 4, 5 and 6, it will be seen that the members 31 and 32 of the female die are arranged at a considerable lateral inclination to the base 39, and that supporting, bracing and strengthening webs 39ª are provided for said die members, extending upwardly from the bed 39; and the bed is secured in place, upon a suitable support, by bolts passing through holes 49 in said bed. The male die 44 is supported by suitable means conventionally shown at 50.

Having produced the body-shape of Figures 8 and 11 by subjecting the secondary product to the dies of Figures 4 to 6, the final step in my process is to secure the body-shape of Figures 8 and 11 to the wooden frame usually employed in vehicle bodies. This is accomplished by bringing the wooden frame and body-shape together intimately, in any suitable way, as by setting the body-shape about the wooden frame, or by forcing the wooden frame into the body-shape, and then hammering or beating the edges 51 of the body-shape over the wooden frame or form to secure the two together, and the two may be finally secured together by short nails, screws or other securing media. It will be understood that the wooden frame is set within the hollow of the projections 20 and that the angular members 16, 17, 18 and 19 cover the frame partially, so that the beating down process results in approximately covering the outline members of the frame.

From the foregoing, it will be seen that my process for making vehicle bodies consists (1) in producing, as a primary product, a sheet metal blank,—Figure 1,— which is, generally speaking, the outline shape of the vehicle-body; and then (2) in subjecting said blank to the action of a pair of semi-forming or primary dies,—Figures 2 and 3,—to give the majority of the structural or characteristic features to the sheet metal blank B, by pressing or stamping, thus producing a secondary product as in Figures 9 and 10; then (3) in subjecting the secondary product to the action of a pair of secondary or finishing dies,—Figures 4 to 6,—which gives the final form and structural characteristics to the sheet metal blank and the final set or shape essential to the vehicle body, this finished product being shown in Figures 8 and 11 and being a body-shape; and then (4) in hammering, beating, or otherwise turning the edges of the body-shape or die-product over and upon the wooden frame or form to primarily secure the two together, which latter step may be supplemented by applying other fastening media driven through the body-shape into the wooden frame or form.

Thus, by simple manipulations of a single sheet of steel, iron, or other stiff material, a vehicle body, such as a tonneau for automobiles, may be produced with great facility, quickly, economically and with a minimum of labor; but, I desire it understood that my invention is not limited to the precise steps set forth, nor to the particular form of dies shown, nor to the production of the particular form of vehicle body shown and described. On the contrary, within the scope of my invention, I may change, modify, add to or subtract from, the steps of my method, and I may alter the form of my dies and the form of my products; and, after the primary product is produced, I may give its final form in various other ways, without departing from the spirit and scope of my invention, as hereinafter claimed.

While I have, in Figures 6 and 8, shown that the final product may have its side members substantially parallel or at a right-angle to the back member, I wish it understood that said side members may be set, by the secondary dies, so that they will be slightly spread apart or flared away from the back member at an obtuse angle, as shown in Figure 11. This will enable the body-frame to be set in the body-shape, or the latter to be drawn upon the body-frame without the necessity of spreading the body-shape for the purpose. Hence, in the claims I have referred to this feature by the words "approximately parallel", and desire it understood that I wish thereby to cover both ideas of form of the final product.

Having thus described my invention, what I claim and desire to secure by Letters Patent is:

1. The method of making body-shapes for vehicle bodies from a single piece of sheet material, comprising producing from said material an outline shape of the finished product; bending said shape simultaneously in several different angular directions to produce a curved back portion and two side members having wheel cavities; and then bending said product simultaneously in several different angular directions to give the back portion its final form and bring the two side members into substantial parallelism.

2. The method of making body-shapes for vehicle bodies from a single piece of sheet material, comprising producing from said material an outline shape of the finished product; bending said shape simultaneously in several different angular directions to produce a curved back portion, two side members, and a groove at the junction of said side members and said back portion; and then bending said product simultaneously in several different angular directions to give the back portion its final form and bring the two side members into substantial parallelism.

3. The method of making body-shapes for automobile bodies from a single piece of sheet material, comprising producing from said material an outline shape of the finished product; subjecting the shape to the cooperative action of a pair of suitably formed dies adapted to produce in said shape an inwardly bulged central portion to provide surplus material for the subsequent formation of the back member and to produce spread apart side members; and subjecting the said product to the action of another pair of dies to force the side members into substantial parallelism and force the back member outwardly to give thereto a convexed formation in two directions at a right-angle to each other.

4. The method of making automobile bodies from a single piece of sheet material, comprising producing from said material an outline shape of the finished product; subjecting the shape to the cooperative action of a pair of suitably formed dies adapted to produce in said shape an inwardly bulged central portion to provide surplus material for the subsequent formation of the back member and to produce a pair of side members; subjecting the said product to the action of another pair of dies to force the side members into substantial parallelism and force the back member outwardly to give thereto a convexed formation in two directions at a right-angle to each other; and fitting the product thus produced to a frame by beating the marginal edges thereof over and around the frame.

5. The method of producing a vehicle body from a single piece of sheet material, comprising producing from said material an outline shape of the finished product; subjecting the shape to pressure to give the same a central, inwardly bulged portion to provide surplus material for the subsequent formation of the back member and to produce two adjoining flared or spread apart members; subjecting the product to pressure to give to the central member a double convexity and to bring the side flared members into substantial parallelism; and securing the edges of the product thus produced to a frame.

6. The method of producing an automobile body from a single piece of sheet material, comprising producing from said material an outline shape of the finished product; bending the shape into a predetermined form and simultaneously producing in the same opposite wheel depressions and other predetermined characteristics; bending the article thus produced to provide parallel side members and a convexed back member; and securing the product to a frame to give it the final set.

7. The method of producing tonneau bodies for automobiles from a single piece of sheet material, comprising producing from said material an outline shape of the finished product; pressing the shape into a preliminary form wherein a curved back and two flared sides are provided, and simultaneously producing substantially all the required characteristics of said body; pressing the product thus produced into final predetermined form; and securing the edges of the product to a suitable frame.

8. The method of producing vehicle bodies from a single piece of sheet material, comprising producing a blank the outline of which approximates that of the body when completed; subjecting said blank to the pressure of a pair of primary forming dies to produce in said shape an inwardly bulged, central portion to provide surplus material for the subsequent formation of the back and to produce two spread apart side-body members; subjecting said blank to the further pressure of a pair of secondary forming dies to force the central portion outwardly and bring the side-body members into approximate parallelism; and securing the product thus formed to a frame.

9. The method of producing vehicle bodies from a single piece of sheet material, comprising producing a blank the outline of which approximates that of the body when completed; subjecting said blank to the action of dies to produce a back and two side-body members with certain predetermined features adapting it for a predetermined vehicle; subjecting said blank to further pressure of a pair of dies to bring the side-body members into approximate parallelism; and securing the product thus formed to a frame.

10. The method of producing vehicle bodies from a single piece of sheet material, comprising producing a blank the outline of which approximates that of the body when completed; subjecting said blank to the action of dies to produce a back and two side-body members with certain predetermined features adapting it for a predetermined vehicle; subjecting said blank to further pressure of a pair of dies to bring the side-body members into approximate parallelism and add to the blank other desired features; and securing the product thus formed to a frame.

11. The method of making body shapes for automobile bodies from a single piece of sheet material, comprising producing from said material an outline shape of the finished product; bending the shape into a preliminary form wherein a curved back and two flared sides are provided, the latter each having wheel depressions; and bending the article thus produced to bring the flared sides into parallelism.

12. The method of making body shapes for automobile bodies from a single piece of sheet material, comprising producing from said material an outline shape of the finished product; subjecting the shape to the cooperative action of a pair of suitably formed dies adapted to produce a back member and spread-apart side members, the latter each having a wheel cavity; and subjecting the said product to the action of another pair of dies to force the side members into substantial parallelism and force the back member outwardly to give thereto a convexed formation in two directions at a right-angle to each other.

Signed by me, at South Bend, Indiana, this 21st day of May 1920.

EDGAR R. STODDARD.

Witnesses:
 ELIAS W. STRICKLAND,
 ALMA RHEAD.